United States Patent [19]
Kakizaki

[11] Patent Number: 5,328,202
[45] Date of Patent: Jul. 12, 1994

[54] APPARATUS FOR CONTROLLING DAMPING COEFFICIENT FOR VEHICULAR SHOCK ABSORBER

[75] Inventor: Shinobu Kakizaki, Atsugi, Japan
[73] Assignee: Atsugi Unisia Corporation, Japan
[21] Appl. No.: 988,193
[22] Filed: Dec. 9, 1992
[30] Foreign Application Priority Data
  Dec. 19, 1991 [JP] Japan .................. 3-336769
[51] Int. Cl.⁵ .................................... B60G 17/08
[52] U.S. Cl. .................... 280/707; 364/424.05
[58] Field of Search ............ 280/707; 364/424.05
[56] References Cited
  U.S. PATENT DOCUMENTS

| | | | |
|---|---|---|---|
| 3,606,365 | 9/1971 | Strong | 280/707 X |
| 4,747,615 | 5/1988 | Yamamoto | 364/424.05 X |
| 4,765,648 | 8/1988 | Mander et al. | 280/707 |
| 4,905,152 | 2/1990 | Kawabata | 280/707 X |
| 4,934,731 | 6/1990 | Hiwatashi et al. | 280/707 X |
| 5,060,157 | 10/1991 | Tado et al. | 280/707 X |
| 5,176,399 | 1/1993 | Takehara et al. | 280/707 |

FOREIGN PATENT DOCUMENTS
61-127007  7/1986  Japan .

Primary Examiner—Margaret A. Focarino
Assistant Examiner—Peter C. English
Attorney, Agent, or Firm—Ronald P. Kananen

[57] ABSTRACT

An apparatus for controlling damping coefficients for vehicular shock absorbers is disclosed comprising a filter circuit which passes only signals whose frequencies fall in a predetermined frequency band. The signals are derived from vehicle behavior detectors which detect vehicular behaviors related to sprung mass longitudinal speeds of a vehicle body. Cut-off frequencies of the filter circuit are varied according to a vehicle speed.

10 Claims, 12 Drawing Sheets

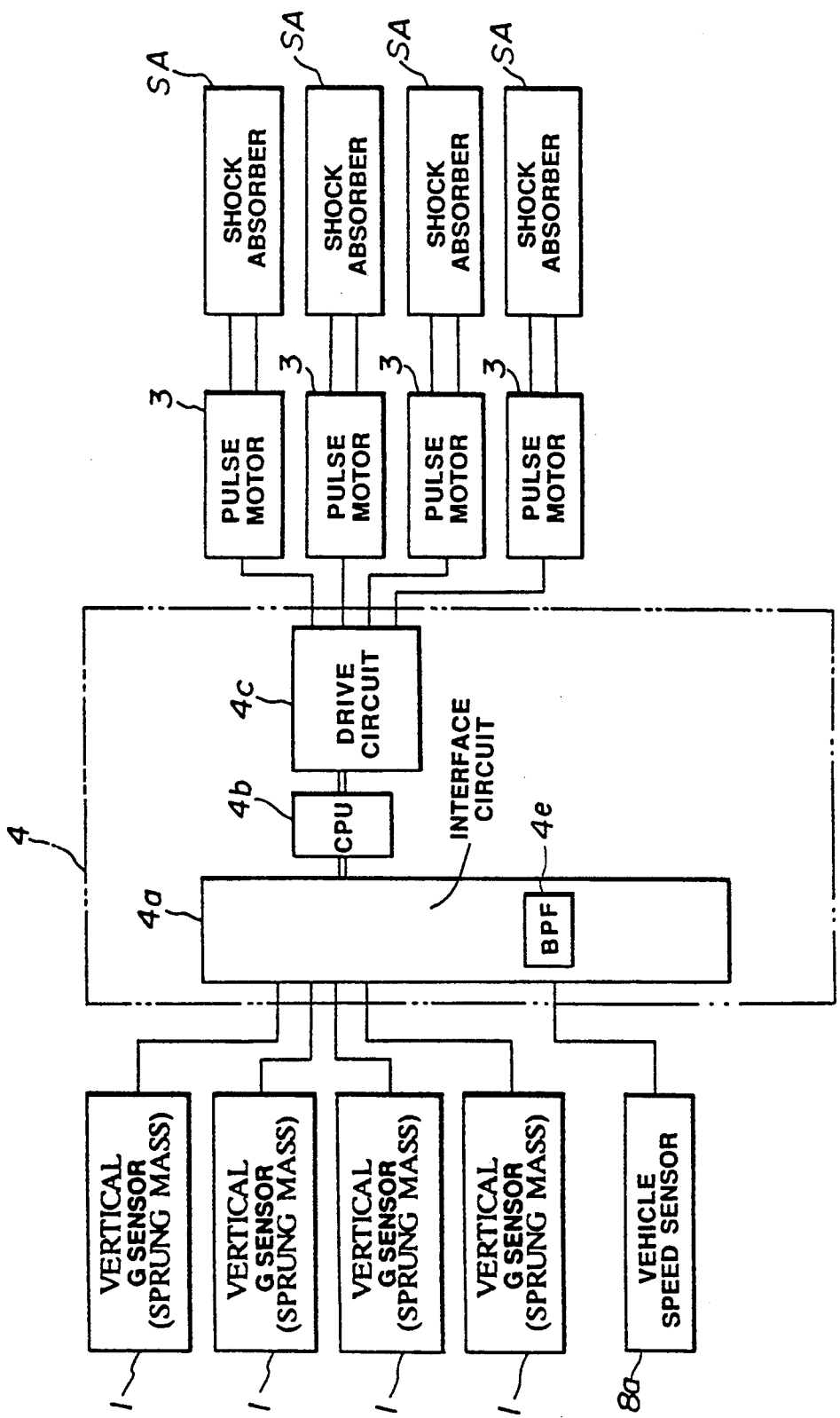

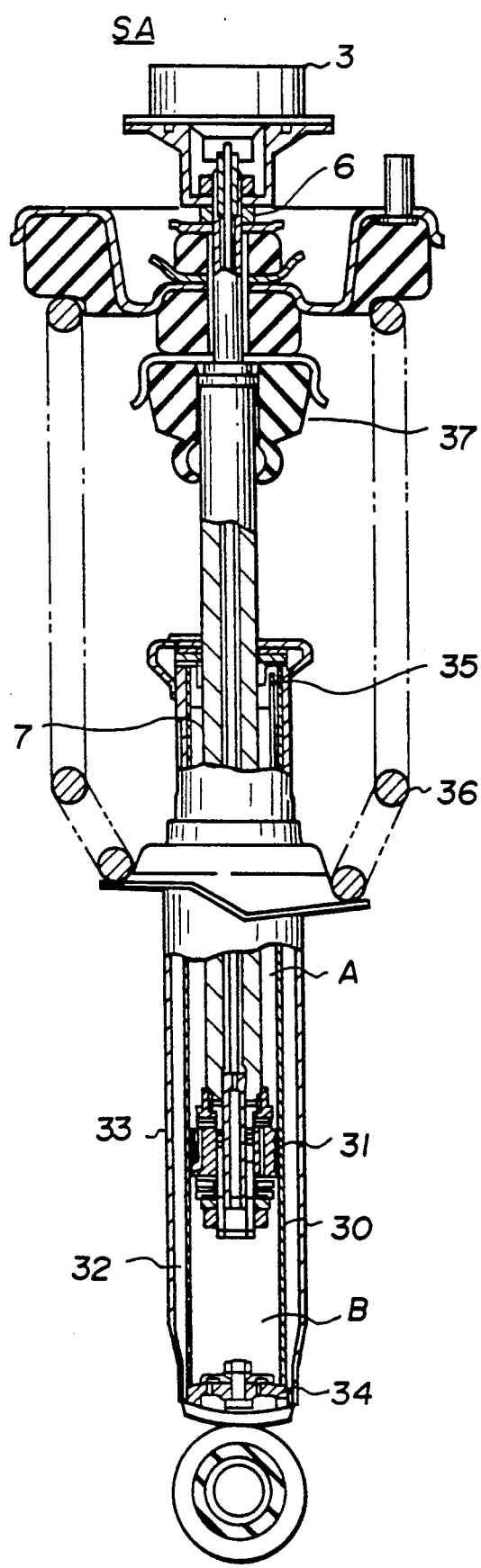

FIG.7(A)  FIG.7(B)  FIG.7(C)
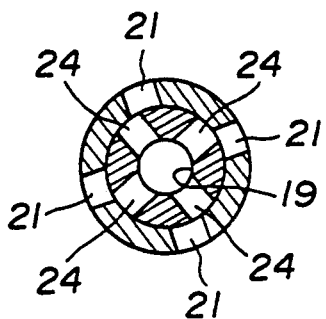
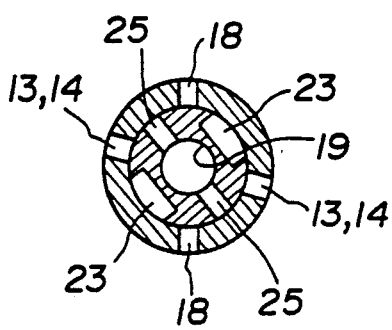
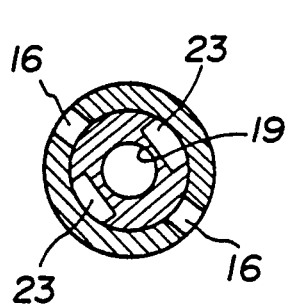
FIG.8(A)  FIG.8(B)  FIG.8(C)
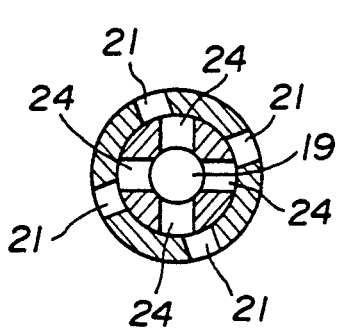
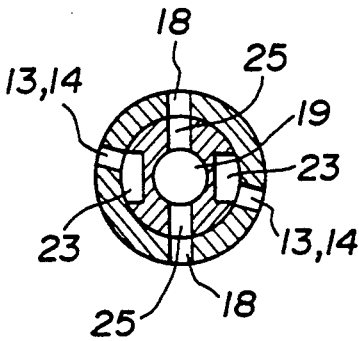
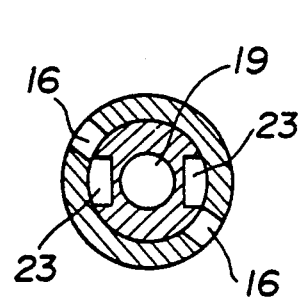
FIG.9(A)  FIG.9(B)  FIG.9(C)
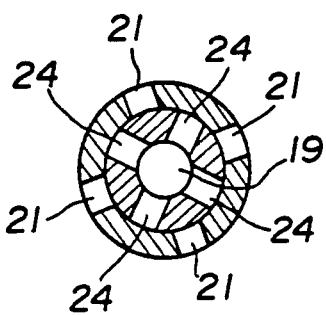
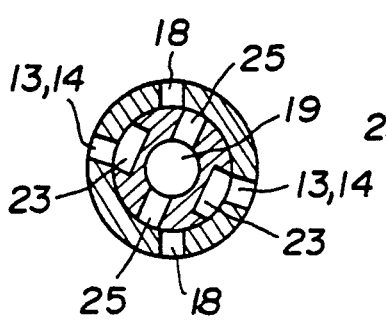
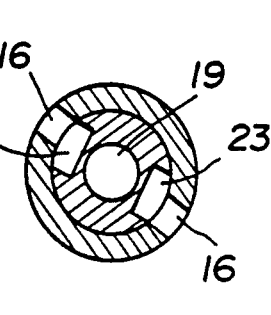

APPARATUS FOR CONTROLLING DAMPING COEFFICIENT FOR VEHICULAR SHOCK ABSORBER

BACKGROUND OF THE INVENTION

1. Field of The Invention

The present invention relates generally to an apparatus for controlling a damping coefficient of a shock absorber (also called a damper, but hereinafter referred to as the shock absorber) interposed between an unsprung mass and sprung mass of the vehicle so as to provide an optimum damping force therefrom. The shock absorber is provided with changing means for changing the damping coefficient thereof at multiple stages in response to a control signal.

2. Description of The Background Art

A Japanese Utility Model Registration Application First Publication No. Showa 61-127007 published on Aug. 9, 1986 exemplifies a previously proposed apparatus for controlling a damping coefficient of the shock absorber.

The previously proposed damping coefficient controlling apparatus includes: a sprung mass displacement measurer; a relative speed measurer between the unsprung mass and the sprung mass; and a control signal output generator.

The control signal output generator outputs a control signal so as to provide a low damping coefficient for the shock absorber when a sign of a direction of the sprung mass displacement coincides with that of the direction of the relative speed and outputs the control signal so as to provide a high damping coefficient for the shock absorber when the sign of the direction of the sprung mass displacement does not coincide with that of the direction of the relative speed.

To pick up a frequency required to control the damping coefficient, waveforms appearing on the signals derived from the sprung mass displacement measurer and from the relative speed measurer are processed using the low-pass filter and high-pass filter circuits.

On the other hand, if the vehicle speed is changed, a frequency characteristic of the detection signal of the sprung mass longitudinal speed is accordingly varied. Since a frequency band to pass through the filter circuits of the previously proposed damping coefficient is fixed, such signals required to control may not be detected and input to a controller and control lag and/or advance may occur.

If a filtered frequency band of each filter is set over a wider frequency band, such a frequency band as not to be required to control may be detected and input, a favorable control effect may not be achieved.

SUMMARY OF THE INVENTION

It is, therefore, a principal object of the present invention to provide an improved apparatus for controlling a damping coefficient of a shock absorber in which a damping coefficient control is carried out on the basis of only a frequency band required to control, even if the vehicle speed is varied, neither control lag nor control advance occur, and a high control effect may be achieved.

The above-described object can be achieved by providing an apparatus for controlling damping coefficients for vehicular shock absorbers, comprising: a) a plurality of shock absorbers interposed between predetermined parts of a vehicle body and respective tire wheels and having damping coefficients changers for arbitrarily changing their damping coefficients of the respective shock absorbers; b) vehicle body behavior detectors for detecting vehicular behaviors related to sprung mass vertical speeds of the vehicle body; c) a filter for passing only signals whose frequencies fall in a predetermined frequency band from among those signals derived from the vehicle body behavior detector; d) damping coefficient controller for controlling the damping coefficients on the basis of signals passed through the filter; e) vehicle speed detectors for detecting a vehicle speed; and f) cut-off frequency controller for setting a cut-off frequency of the filter to a frequency in accordance with the vehicle speed.

BRIEF DESCRIPTION OF THE DRAWINGS

FIGS. 2A and 2B are circuit block diagrams of the shock absorber damping coefficient controlling system in the preferred embodiment shown in FIG. 1.

FIG. 3 is a cross sectional view of a shock absorber used in the preferred embodiment shown in FIG. 2.

FIGS. 7 (A) through 7 (C) are cross sectional views cut away along line K—K of FIG. 4.

FIGS. 8 (A) through 8 (C) are cross sectional views cut away along line M—M of FIG. 4.

FIGS. 9 (A) through 9 (C) are cross sectional views cut away along line N—N of FIG. 4.

DESCRIPTION OF THE PREFERRED EMBODIMENT

Reference will, hereinafter, be made to the drawings in order to facilitate a better understanding of the present invention.

Figure 1:
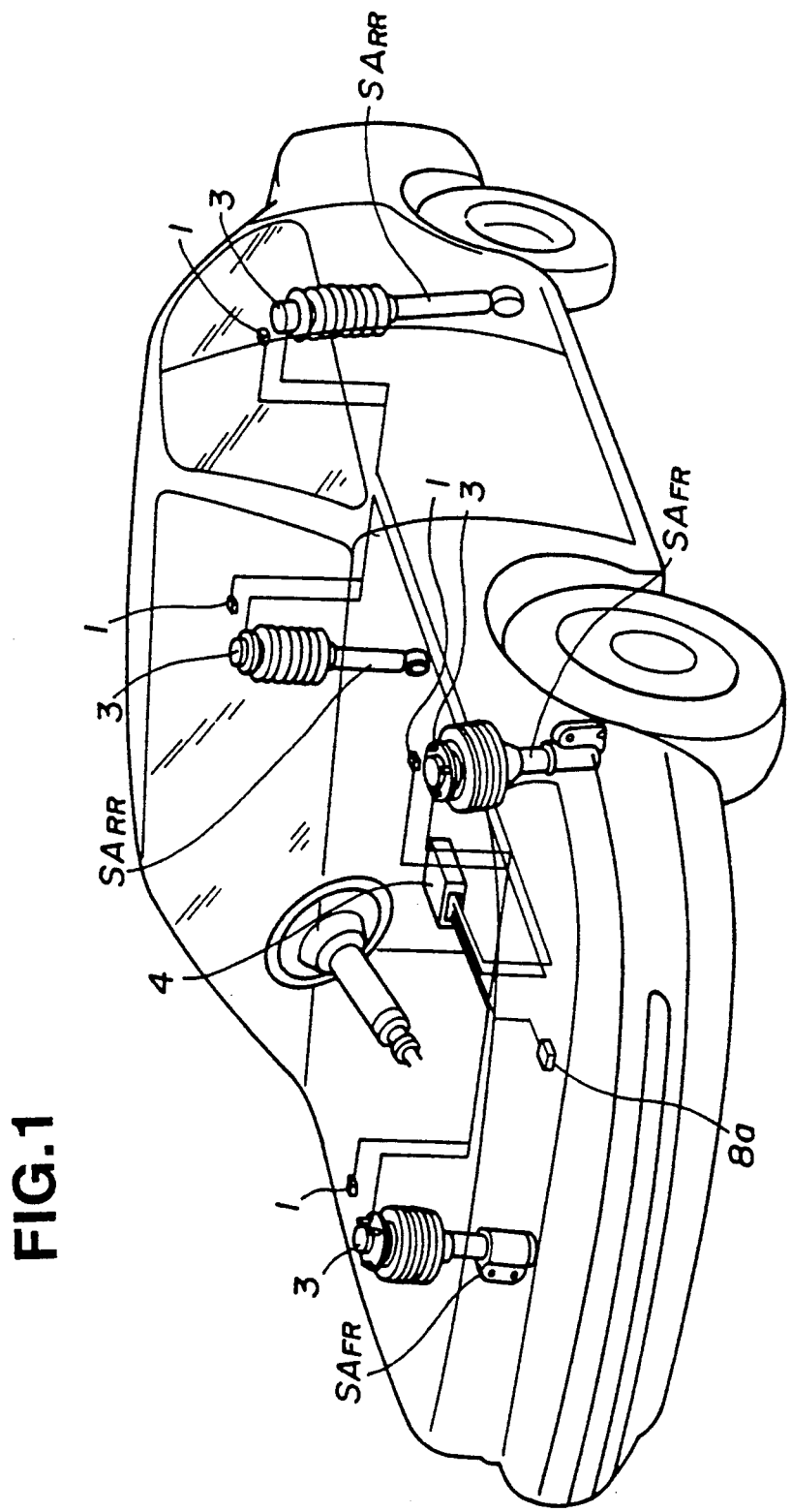
FIG. 1 is a overall view of a damping coefficient controlling system for an automotive vehicle in a preferred embodiment according to the present invention.
Figure 2B:
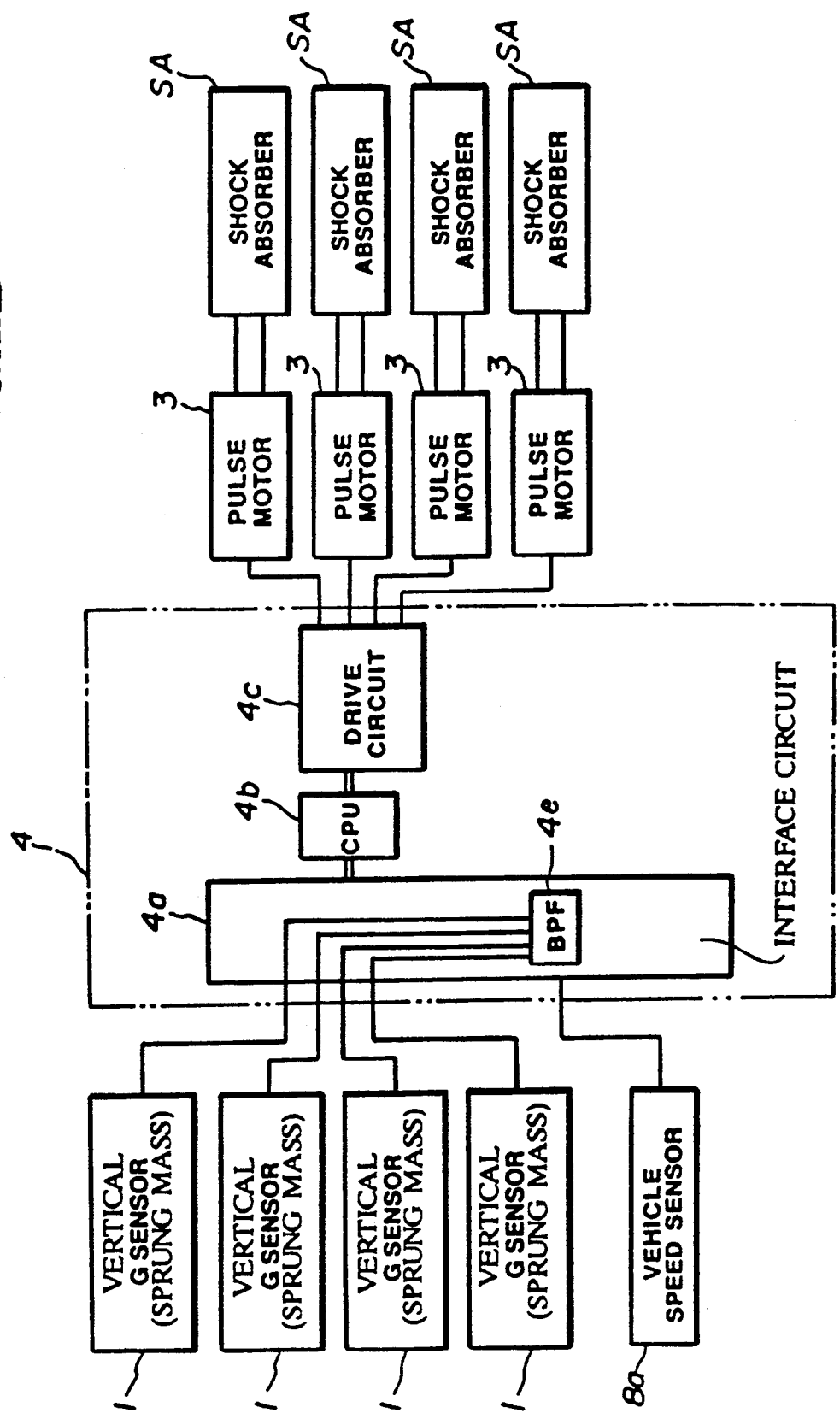

FIG. 1 shows a whole system configuration of a damping coefficient controlling apparatus in a preferred embodiment according to the present invention.

In FIG. 1, each shock absorber of a damping force variable type is disposed between a sprung mass (vehicle body) and an unsprung mass (tire wheel).

That is to say, front wheel side shock absorbers $SA_{FR}$, $SA_{FR}$ and rear wheel side shock absorbers $SA_{RR}$, $SA_{RR}$ are disposed between the vehicle body and respective tire wheels. Vertical G (acceleration) sensors 1 used to detect vertical accelerations are mounted on parts of the vehicle body placed adjacent mounting positions of the respective shock absorbers $SA_{FR}$, $SA_{RR}$ onto the vehicle body. Furthermore, a vehicle speed sensor 8a is installed in an engine compartment to detect the vehicle speed.

A pulse motor 3 is interposed between a control unit 4, i.e., a drive circuit 4c and corresponding shock absorber SA.

A CPU (Central Processing Unit, or alternatively microprocessor) 4b is connected between an interface circuit 4a and drive circuit 4c.

The four longitudinal G sensors 1 are connected to the interface circuit 4a of the control unit 4.

It is noted that the vertical G (accelerations) are detected such that upward acceleration values are indicated by a plus sign (+) and downward acceleration values are indicated by a minus sign (−).

It is noted that a band pass filter (BPF) circuit 4e is disposed in the interface circuit 4a (as will be described later) which passes a predetermined frequency band including a sprung mass resonant frequency from among the sprung mass vertical speed $V_n$ derived and calculated in the CPU 4b as will be described later.

Each pulse motor 3 serves to change stepwise a damping coefficient position of the shock absorber at the multiple stages.

Next, FIG. 3 shows a cross sectional view of each shock absorber $SA_{FR}$ and $SA_{RR}$ hereinafter, the symbol of each shock absorber is representative denoted by SA when a single shock absorber is explained.

Each shock absorber SA comprises: a cylinder 30, a piston 31 disposed in the cylinder 30 so as to divide the cylinder 30 into an upper chamber A and lower chamber B, an outer envelop 33 to form a reservoir C on an outer periphery of the cylinder 30, a base 34 defining the lower chamber B and reservoir C; a guide member 35 guiding the piston rod 7 which is associated with the piston 31; a suspension spring 36 intervened between the outer envelope 33 and vehicle body; and a bumper rubber member (or bushing) 37.

Figure 4:
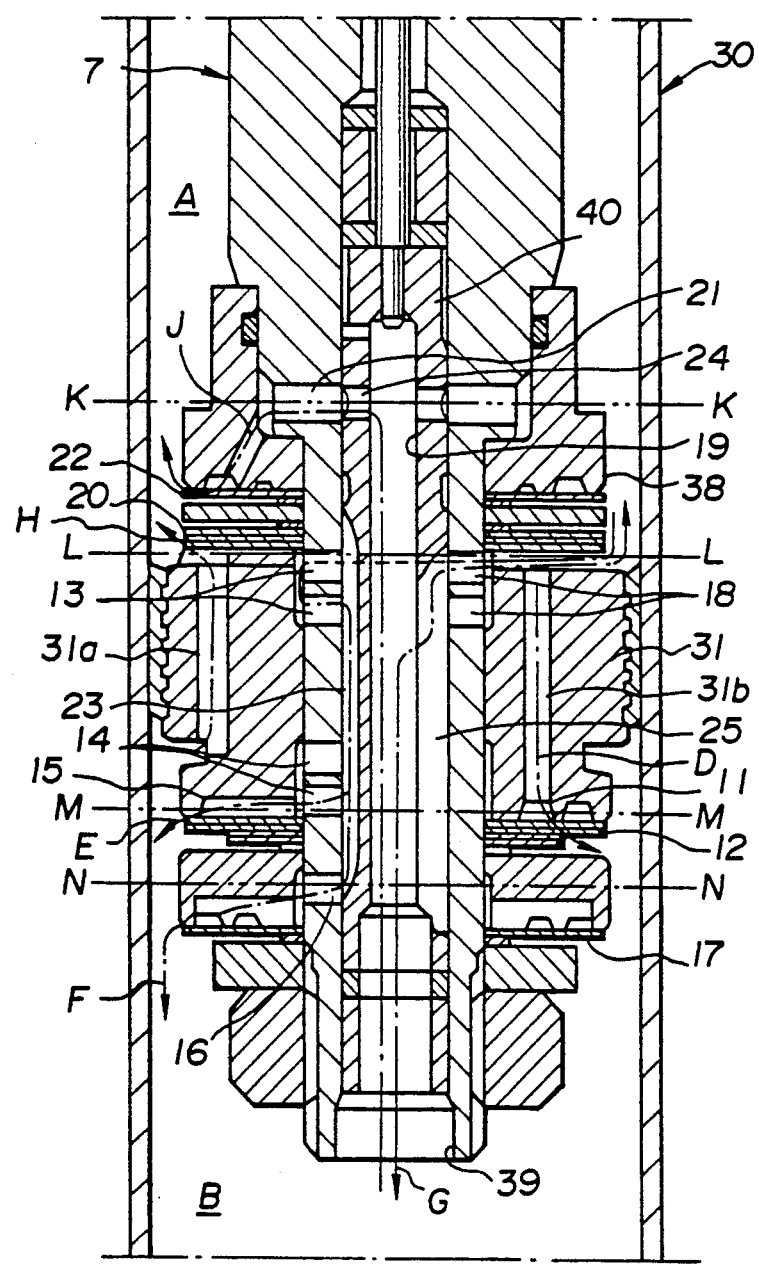
FIG. 4 is an enlarged view of cross sectional view of a piston member of the shock absorber used in the preferred embodiment shown in FIGS. 3 and 4.
Figure 5:
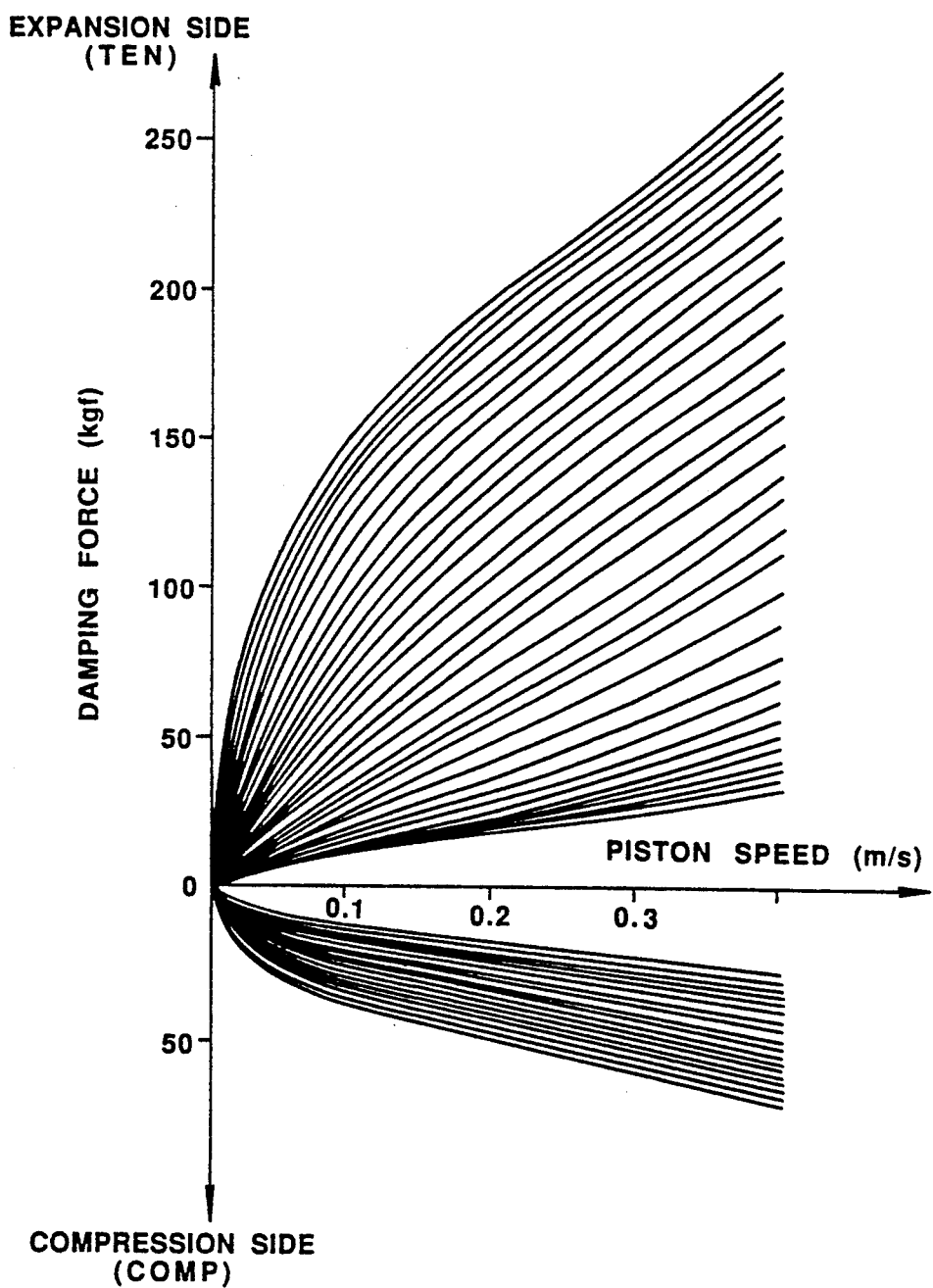
FIG. 5 is a characteristic graph representing damping forces with respect to a piston speed.

Next, FIG. 4 shows an enlarged cross sectional view of the piston 31.

As shown in FIG. 4, the piston 31 is formed with penetrating holes 31a, 31b. An expansion stroke side damping valve 12 and compression stroke side damping valve 20 are installed which open and close the respective penetrating holes 31a, 31b. In addition, a communication hole 39 which communicates between the upper chamber A and lower chamber B is formed in a tip of the piston rod 7 penetrating the piston 31. Furthermore, an adjuster 40 to adjust a cross sectional area of a flow passage of the communication hole 39 is installed. An expansion stroke side check valve 17 and compression stroke side check valve 22 are installed which enable or interrupt the fluid flow of the communication hole 39 according to directions of the fluid flow. It is noted that the adjuster 40 is rotated by means of the pulse motor 3 as shown in FIG. 3. In addition, first port 21, second port 13, third port 18, fourth port 14, and fifth port 16 are formed on the tip of the piston rod 7. In FIG. 4, numeral 38 denotes a retainer on which the compression check valve 22 is seated.

The adjuster 40 is formed with a hollow portion 19. The hollow portion 19 is formed with a first lateral hole 24 and a second lateral hole 25. Furthermore, a longitudinal groove 23 is formed on its outer peripheral portion.

Hence, four flow passages through which the fluid is communicable between the upper chamber A and lower chamber B at the piston's expansion stroke include: 1) an extension side first flow passage D passing through the penetrating hole 31b, an opened valve at an internal portion of the expansion stroke side damping valve 12 and reaching the lower chamber B; 2) an extension (or expansion) side second flow passage E passing through the second port 13, longitudinal groove 23, and fifth port 16, via an opened valve of the expansion stroke side check valve 17 to the lower chamber B; 3) an extension (or expansion) stroke side third flow passage F passing through the second port 13, longitudinal groove 23, and fifth port 16 to the lower chamber B and via the opened extension (expansion) side check valve 17; and 4) a bypass flow passage G passing through the third port 18, the second lateral hole 25 and hollow portion 19.

In addition, the flow passages of the fluid within the lower chamber B compressed during the compression stroke which is communicable with the upper chamber A are divided into three flow passages: 1) a compression side first flow passage H from the opened state of the compression side damping valve 20; 2) a compression side second flow passage J from the hollow portion 19, first lateral hole 24, and first port 21 to the lower chamber B; and 3) the bypass flow passage G from the hollow portion 19, second lateral hole 25, and third port 18 to the upper chamber A.

That is to say, the adjuster 40 of each shock absorber SA is pivoted so that the damping coefficients at the expansion and compression stroke sides can be modified at multiple stages, respectively.

Figure 6:
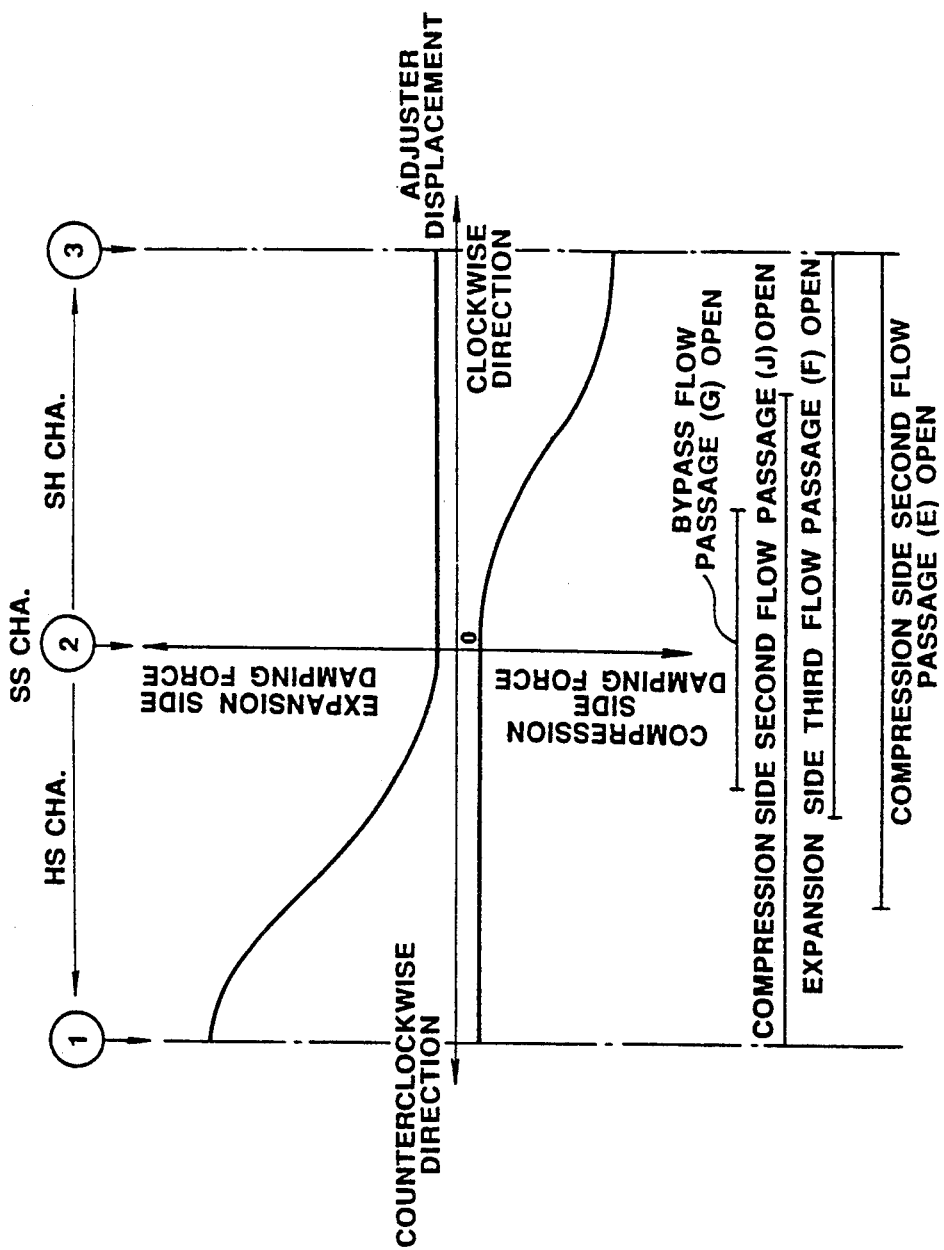
FIG. 6 is a characteristic graph representing change in the damping coefficient with respect to a pulse motor of the shock absorber used in the preferred embodiment.

As shown in FIG. 6, when the adjuster 40 is pivoted in the counterclockwise direction from a position (position of ②) in FIG. 6) at which both expansion and compression stroke sides provide low damping coefficients (in this state, referred hereinafter to as soft characteristic SS), the damping coefficient only at the expansion stroke side is changed toward higher damping coefficient at the multiple stages (hereinafter, referred to as expansion stroke side hard characteristic HS).

On the contrary, when the adjuster 40 is pivoted in the clockwise direction from the position of ②, the damping coefficient only at the compression stroke side is changed at the multiple stages (hereinafter, referred to as compression stroke side hard characteristic SH).

FIGS. 7 (A) through 7 (C), 8 (A) through 8(C), and 9 (A) through 9 (C) show cross sectional views cut away along line K—K, M—M, and N—N in FIG. 4 when the adjuster 40 is pivoted and positioned at three positions, i.e., ① (position at which a maximum damping coefficient is provided in the expansion stroke side), ② (position at which the soft characteristic is provided), ③ (position at which the maximum damping coefficient is provided in the compression stroke side).

Figure 10:
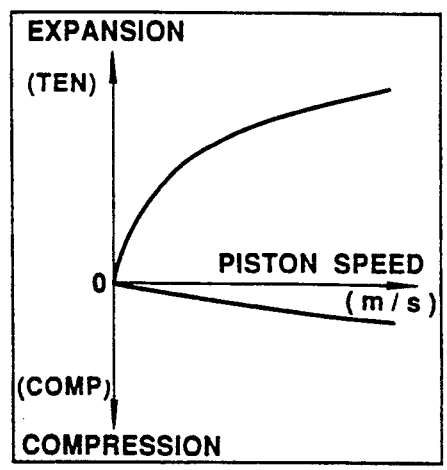
FIG. 10 is a characteristic graph representing a damping force when the shock absorber indicates an expansion stroke side hard damping coefficient.
Figure 11:
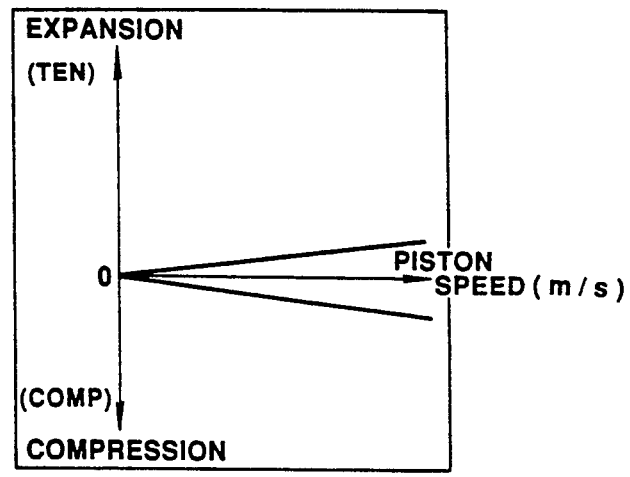
FIG. 11 is a characteristic graph representing a damping force when the shock absorber indicates soft damping coefficients at both expansion and compression stroke sides.
Figure 12:
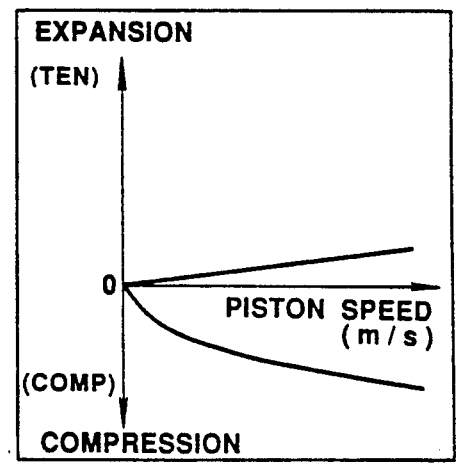
FIG. 12 is a characteristic graph representing a damping force when the shock absorber indicates the compression side hard damping coefficient.

In addition, FIGS. 10, 11, and 12 show damping force characteristics for the respective positions ①, ②, and ③ shown in FIG. 6.

Figure 13:
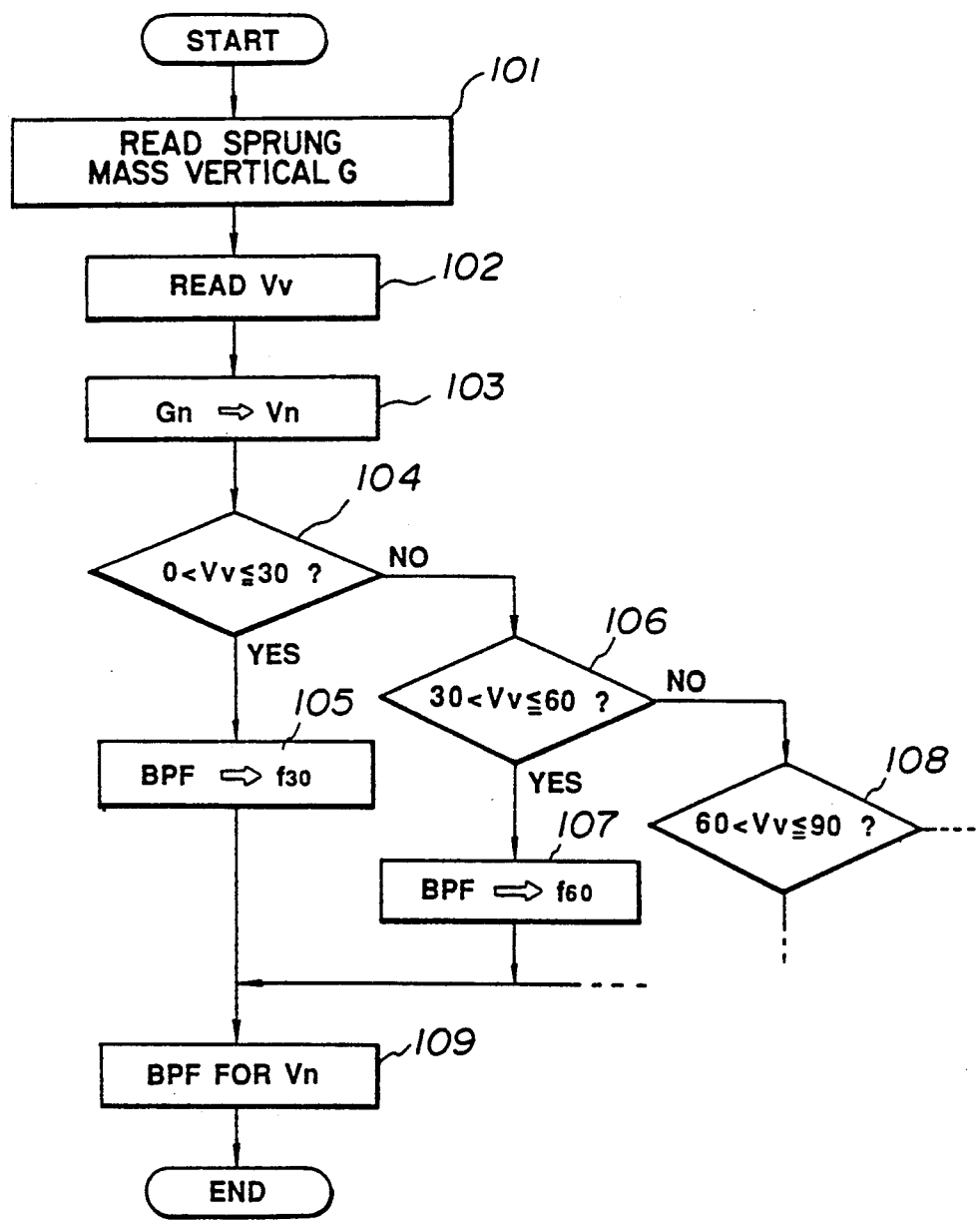
FIG. 13 is an operational flowchart executed by a control unit of the apparatus for controlling a damping coefficient in the preferred embodiment.

Next, FIG. 13 shows an operational flowchart executed by the control unit 4 which controllably drives each pulse motor 3.

First, in a step 101, the CPU 4b reads the detected vertical sprung mass accelerations G from the respective vertical G sensors 1.

In a step 102, the CPU 4b reads the vehicle speed $V_V$ detected by the vehicle speed sensor 8a.

In a step 103, the CPU 4b integrates the read sprung mass vertical accelerations G from the vertical G sensors 1 to derive sprung mass vertical speed $V_n$.

In a step 104, the CPU 4b determines whether the vehicle speed $V_V$ is greater than zero but equal to or lower than 30 Km/h.

If YES in the step 104, the routine goes to a step 105. If NO in the step 104, the routine goes to a step 106.

In a step 105, the CPU 4b sets cut-off frequencies $f_{30}$ (refer to a frequency characteristic of FIG. 14) which define upper limit and lower limit frequencies of a frequency band through which the band pass filter circuit 4e can pass. It is noted that the four set cut-off frequencies are $f_{30}$, $f_{40}$, $f_{90}$, and $f_{120}$ in order from a lower frequency as shown in FIG. 14.

Referring to FIG. 13, in a step 106, the CPU determines whether the vehicle speed $V_v$ is greater than 30 Km/h but equal to or lower than 60 Km/h.

If YES in the step 106, the routine goes to a step 107. If NO in the step 106, the routine goes to a step 108.

Figure 14:
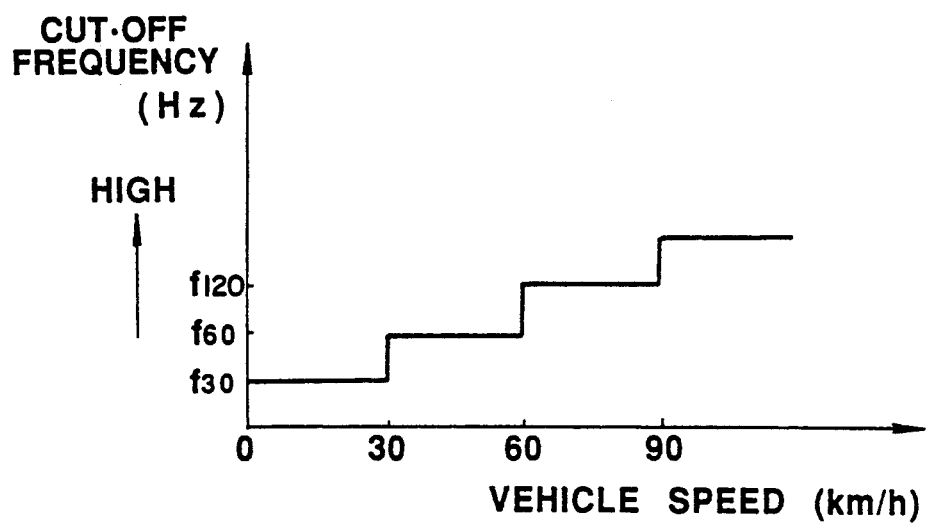
FIG. 14 is a characteristic graph of a cut-off frequency in the preferred embodiment of the damping coefficient controlling apparatus.

In the step 107, the CPU 4b sets the cut-off frequencies of the frequency band to be passed through the BPF circuit 4e to $f_{60}$ (refer to the frequency characteristic graph of FIG. 14).

In the step 108, the CPU 4b determines whether the vehicle speed $V_v$ is greater than 60 Km/h but lower than 90 Km/h.

Next steps advanced from the step 108 include a step to set the cut-off frequencies in the same way as the steps 104 and 106 and a step to determine a speed range of the vehicle speed $V_v$.

However, since the contents are the same as those in the steps 104, and 106, the corresponding explanation and drawings are omitted herein.

In a step 109, the CPU 4b carries out a filtering of the sprung mass vertical speed $V_n$ by means of the band pass filter (BPF) circuit 4e.

Furthermore, the control unit 4 determines a target damping coefficient position in proportion to the vertical sprung mass speed $V_n$ in a frequency band derived in accordance with the operational flowchart of FIG. 13.

That is to say, this control is such that if the sprung mass vertical speed $V_n$ is upward, the damping coefficient at the expansion stroke side is changed at the multiple stages in proportion to a magnitude of the sprung mass vertical speed $V_n$ with the expansion stroke side hard characteristic HS. If the sprung mass vertical speed $V_n$ is downward, the damping coefficient at the compression stroke side is changed at the multiple stages in proportion to the magnitude of the sprung mass vertical speed $V_n$ with the compression stroke side hard characteristic SH.

Figure 15:
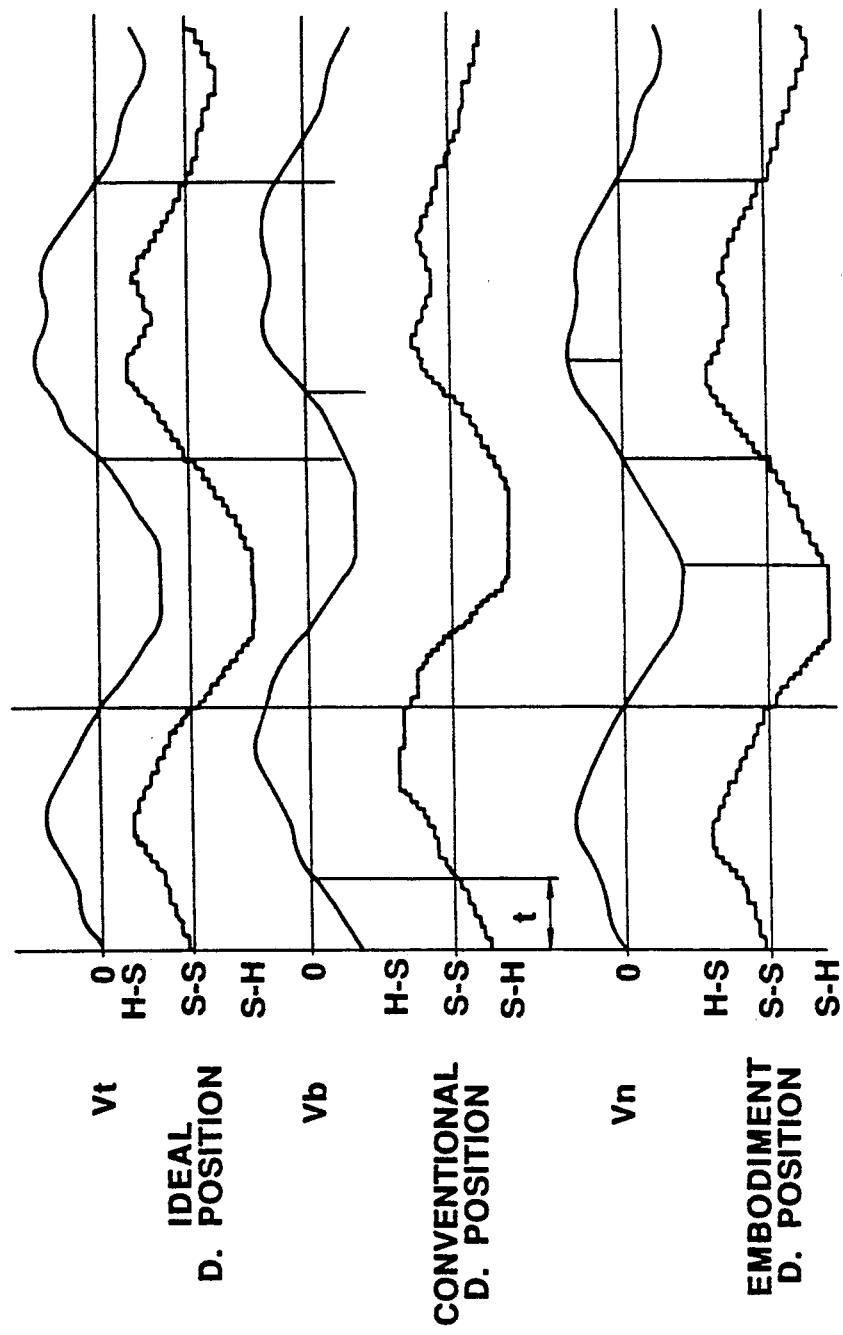
FIG. 15 is a timing chart of a series of operations in the preferred embodiment of the damping coefficient controlling apparatus according to the present invention.

FIG. 15 shows a timing chart for explaining an operation of the damping coefficient controlling apparatus in the preferred embodiment.

In FIG. 15, upper most stage indicates a change of the actual sprung mass vertical speed $V_t$ and an ideal damping position in a case where an optimum damping coefficient control is carried out in accordance with the change in the actual sprung mass vertical speed.

In the next lower stage of FIG. 15 — is the sprung mass vertical speed $V_b$ detected according to a conventional method and a conventional damping position in a case when the optimum damping coefficient control is carried out on the basis of the detected sprung mass vertical speed $V_b$.

In the lowest stage of FIG. 15 — is the detected sprung mass vertical speed $V_n$ in case of the preferred embodiment and damping position of the preferred embodiment in a case when the optimum damping coefficient control is carried out in accordance with the detected sprung mass vertical speed $V_n$ in the case of the preferred embodiment.

As appreciated from FIG. 15, a phase delay t occurs in the detected sprung mass vertical speed $V_b$ in the case of the previously proposed apparatus for controlling the damping coefficient. Therefore, the damping coefficient control becomes delayed. The insufficient control force or excessive control force may be brought out.

On the other hand, in the preferred embodiment, the actual sprung mass vertical speed $V_t$ is accurately detected and the same damping position as the ideal damping position can be obtained.

Although the frequency characteristic of the sprung mass vertical speed $V_n$ is varied according to a change in the vehicle speed, the apparatus for controlling the damping coefficient accurately detects the cut-off frequencies at the frequency band used to control the damping coefficient. Consequently, a delay or advance does not occur in the detected sprung mass vertical speed $V_n$. Thus, the actual sprung mass vertical speed can accurately be detected. The effective control force can be achieved in the damping coefficient control.

Figure 16:
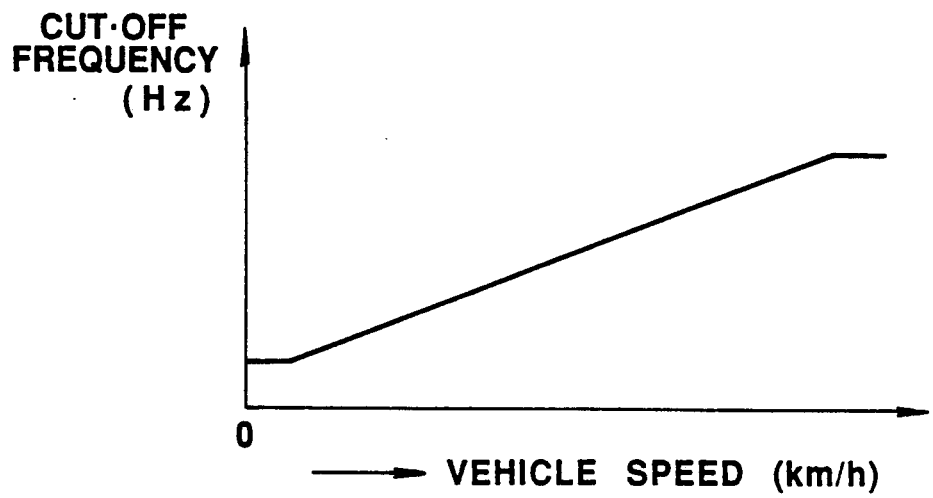
FIG. 16 is a characteristic graph of a modification of the cut-off frequency in the preferred embodiment of the damping coefficient controlling apparatus according to the present invention.

It is noted that although in the preferred embodiment the cut-off frequencies of the BPF circuit 4e are changed stepwise according to the vehicle speed as shown in FIG. 14, the cut-off frequencies may be changed linearly in a first-order proportion to the vehicle speed as shown in FIG. 16.

In the preferred embodiment, the signal indicating the calculated sprung mass vertical speed is passed through the BPF circuit 4e. Alternatively, the signals derived from the respective vertical G sensors may be passed through the BPF circuit and may be used to calculate the sprung mass vertical speeds. Essentially, the filter circuit may be interposed in a location at which the damping coefficients are determined using the detection signals indicating the vehicular behavior.

As described hereinabove, in the shock absorber damping coefficient controlling apparatus according to the present invention, the cut-off frequencies of the filter circuit are varied according to the vehicle speed.

Therefore, it is not necessary to excessively widen the frequency band to be passed through the filter circuit and the signals in the frequency band required to control the damping coefficients can appropriately be passed. Consequently, neither control delay nor control advance may occur. A high control effect can be achieved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for controlling damping coefficients for vehicular shock absorbers, comprising:
   a) a plurality of shock absorbers, each shock absorber being interposed between a sprung mass and an unsprung mass of a vehicle;
   b) damping coefficient changing means for varying the damping coefficients of each shock absorber at at least one stroke direction with respect to a piston of the corresponding shock absorber in response to an input control signal;
   c) vehicle body behavior detecting means for detecting vehicle body vertical accelerations, for deriving vehicle body vertical speeds from said vertical accelerations, and for outputting signals representing said vertical speeds;
   d) filtering means for filtering the output signals from said vehicle body behavior detecting means so as to pass only signal components which fall in a predetermined frequency band from among the output signals outputted from said vehicle body behavior detecting means;
   e) damping coefficient controlling means for producing the control signal to the damping coefficient changing means so as to control the damping coefficients of the respective shock absorbers via said damping coefficient changing means on the basis of the signals passed through said filtering means;
   f) vehicle speed detecting means for detecting a vehicle speed; and
   g) cut-off frequency controlling means for variably setting a cut-off frequency of the filtering means to a frequency varied in accordance with the detected vehicle speed.

2. An apparatus for controlling damping coefficients for vehicular shock absorbers, as set forth in claim 1, wherein said cut-off frequency increases as the vehicle speed increases.

3. An apparatus for controlling damping coefficients for vehicular shock absorbers, as set forth in claim 1, where in said cut-off frequency increases stepwise as the vehicle speed increases.

4. An apparatus for controlling damping coefficients for vehicular shock absorbers, as set forth in claim 3, wherein said filtering means comprises a band pass filter and said vehicle body detecting means comprises sprung mass vertical acceleration sensors for detecting said vehicle body vertical accelerations.

5. An apparatus for controlling damping coefficients for vehicular shock absorbers, as set forth in claim 4, wherein said band pass filter is interposed between the vertical acceleration sensors and the damping coefficient controlling means.

6. An apparatus for controlling damping coefficients for vehicular shock absorbers, as set forth in claim 5, wherein said damping coefficient controlling means derives sprung mass vertical speeds on the basis of the signals passed through the band pass filter.

7. An apparatus for controlling damping coefficients for vehicular shock absorbers, as set forth in claim 4, wherein said band pass filter passes signals indicating the derived sprung mass vertical speeds and whose frequencies fall in the predetermined frequency band of the band pass filter.

8. An apparatus for controlling damping coefficients for vehicular shock absorbers, as set forth in claim 7, wherein said band pass filter is provided with upper and lower cut-off frequencies defining the predetermined frequency band and both cut-off frequencies are set so as to be proportional to the vehicle speed.

9. An apparatus for controlling damping coefficients for vehicular shock absorbers, as set forth in claim 8, wherein said cut-off frequencies increase stepwise as the vehicle speed increases, thereby defining four cut-off frequency stages.

10. An apparatus for controlling damping coefficients for vehicular shock absorbers, comprising:
   a) a plurality of shock absorbers interposed between a sprung mass and an unsprung mass of a vehicle and having damping coefficient changing means for changing the damping coefficients of the respective shock absorbers;
   b) vehicle body behavior detecting means for detecting vehicle body vertical accelerations, for deriving vehicle body vertical speeds from said vertical accelerations, and for outputting signals representing said vertical speeds;
   c) filtering means for passing only signals whose frequencies fall in a predetermined frequency band from among the signals outputted from the vehicle body behavior detecting means;
   d) damping coefficient controlling means for controlling the damping coefficient changing means on the basis of the signals passed through the filtering means;
   e) vehicle speed detecting means for detecting a vehicle speed; and
   f) cut-off frequency controlling means for setting a cut-off frequency of the filtering means to a frequency proportional to the detected vehicle speed.

* * * * *